United States Patent
Hickenboth et al.

(10) Patent No.: US 9,051,426 B2
(45) Date of Patent: Jun. 9, 2015

(54) POLYMERIZABLE COMPOSITIONS CONTAINING ETHYLENICALLY UNSATURATED MONOMERS HAVING EPISULFIDE FUNCTIONAL GROUPS AND RELATED METHODS

(71) Applicant: PPG INDUSTRIES OHIO, INC., Cleveland, OH (US)

(72) Inventors: Charles R. Hickenboth, Cranberry Township, PA (US); Federico Menta, Pittsburgh, PA (US); Nina V. Bojkova, Monroeville, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 45 days.

(21) Appl. No.: 13/864,785

(22) Filed: Apr. 17, 2013

(65) Prior Publication Data

US 2013/0225777 A1     Aug. 29, 2013

Related U.S. Application Data

(63) Continuation-in-part of application No. 13/605,100, filed on Sep. 6, 2012.

(60) Provisional application No. 61/638,655, filed on Apr. 26, 2012, provisional application No. 61/532,275, filed on Sep. 8, 2011.

(51) Int. Cl.

| | | |
|---|---|---|
| *C08F 128/06* | (2006.01) | |
| *C08F 134/04* | (2006.01) | |
| *C08F 228/06* | (2006.01) | |
| *C08F 234/04* | (2006.01) | |
| *C08F 28/06* | (2006.01) | |
| *C08F 34/04* | (2006.01) | |
| *C08F 220/38* | (2006.01) | |
| *C08F 222/10* | (2006.01) | |
| *G02B 1/04* | (2006.01) | |
| *C08G 63/68* | (2006.01) | |
| *C08G 75/00* | (2006.01) | |

(52) U.S. Cl.
CPC .............. *C08G 75/00* (2013.01); *C08F 220/38* (2013.01); *C08F 222/1006* (2013.01); *G02B 1/04* (2013.01)

(58) Field of Classification Search
USPC .......... 252/585; 427/385.5; 522/28; 523/440, 523/456, 461; 524/419; 525/381, 382, 525, 525/533; 526/220, 256; 528/374, 377, 406, 528/360
See application file for complete search history.

(56) References Cited

U.S. PATENT DOCUMENTS

| | | | |
|---|---|---|---|
| 4,414,081 A * | 11/1983 | Eranian et al. | 427/498 |
| 5,789,476 A | 8/1998 | Iryo et al. | |
| 5,916,987 A | 6/1999 | Kobayashi et al. | |
| 6,117,923 A * | 9/2000 | Amagai et al. | 523/440 |
| 6,765,071 B1 * | 7/2004 | Fujishiro et al. | 525/533 |
| 2005/0261406 A1 | 11/2005 | Nakayama et al. | |
| 2010/0130661 A1 * | 5/2010 | Takeuchi et al. | 524/419 |

FOREIGN PATENT DOCUMENTS

| | | | |
|---|---|---|---|
| CH | WO 2010/128062 | * | 11/2010 |
| CN | 1414987 A | | 4/2003 |
| JP | 4-11613 A | | 1/1992 |
| JP | 2867638 B2 | | 12/1998 |
| WO | 01/36506 | | 5/2001 |

OTHER PUBLICATIONS

Search Report dated May 14, 2014 for Taiwan Application No. 101132821.
Espacent English abstract of JP 2867638 B2.
Espacent English abstract of JP 4-11613 A.

* cited by examiner

*Primary Examiner* — Bijan Ahvazi
(74) *Attorney, Agent, or Firm* — The Webb Law Firm

(57) ABSTRACT

Provided is a polymerizable composition of (a) a monomer composition including ethylenically unsaturated monomer having a β-epithiopropyl functional group; (b) optionally, a compound having two or more β-epithiopropyl functional groups but no polymerizable ethylenically unsaturated groups; (c) an isourea functional polymerization initiator; and (d) a catalyst for reaction between the β-epithiopropyl functional groups. Also provided is a method of reducing the yellowness index of a sulfur-containing polymerizate prepared by addition polymerization, the method including reacting in the presence of an isourea functional polymerization initiator and a catalyst for reaction between β-epithiopropyl functional groups, a polymerizable composition of: (a) a monomer composition including ethylenically unsaturated monomer having a β-epithiopropyl functional group; and, optionally, (b) a compound having two or more β-epithiopropyl functional groups but no polymerizable ethylenically unsaturated groups.

18 Claims, No Drawings

POLYMERIZABLE COMPOSITIONS CONTAINING ETHYLENICALLY UNSATURATED MONOMERS HAVING EPISULFIDE FUNCTIONAL GROUPS AND RELATED METHODS

CROSS-REFERENCE TO RELATED APPLICATIONS

This application claims the benefit of priority from U.S. Provisional Patent Application No. 61/638,655, filed Apr. 26, 2012; and this application is a continuation-in-part of U.S. patent application Ser. No. 13/605,100, filed Sep. 6, 2012 which claims the benefit of priority from U.S. Provisional Patent Application No. 61/532,275, filed Sep. 8, 2011, all of which prior applications are incorporated by reference herein in their entirety.

FIELD OF THE INVENTION

The present invention relates to polymerizable compositions that include ethylenically unsaturated monomers having episulfide functional groups such as β-epithiopropyl functional groups in the monomer, and to methods of reducing the yellowness index of a sulfur-containing polymerizate prepared by addition polymerization.

BACKGROUND OF THE INVENTION

Polymeric materials, such as plastics, have been developed as alternatives and replacements for silica based inorganic glass in applications such as, optical lenses, fiber optics, windows and automotive, nautical and aviation transparencies. These polymeric materials can provide advantages relative to glass, including, shatter resistance, lighter weight for a given application, ease of molding and ease of dyeing. Representative examples of such polymeric materials include, poly(methyl methacrylate), polycarbonate and poly(diethylene glycol bis(allylcarbonate)).

The refractive indices of many polymeric materials are generally lower than that of high index glass. For example, the refractive index of poly(diethylene glycol bis(allylcarbonate)) is about 1.50, compared to that of high index glass, which can range, for example, from 1.60 to 1.80.

Polymeric materials (polymerizates) prepared from the polymerization of monomers containing aromatic rings and/or sulfur typically have high refractive indices. Polymeric materials having a combination of high refractive indices, such as at least 1.57, and low levels of chromatic dispersion (e.g., having ABBE numbers of at least 30), can be prepared from monomers containing certain heteroatoms, such as sulfur atoms. Such polymerizates are very useful in the making of optical elements requiring superior optical properties. However, yellowing is often a problem in polymerizates that contain sulfur. Also, polymerization initiators that are conventionally used in such compositions can have safety risks associated with them. For example, peroxides are ignitable and present explosion hazards. Certain initiators, including peroxides and azo initiators, can generate gases during polymerization, causing safety concerns and potentially affecting the appearance of the final polymerizate product.

It would be desirable to develop polymerizable compositions that provide desirable optical properties, such as high refractive index, with acceptable yellowness indices.

SUMMARY OF THE INVENTION

In accordance with the present invention, there is provided a polymerizable composition comprising, (a) a monomer composition comprising at least one ethylenically unsaturated monomer having a β-epithiopropyl functional group; (b) optionally, a compound having two or more β-epithiopropyl functional groups but no polymerizable ethylenically unsaturated groups; (c) an isourea functional polymerization initiator; and (d) a catalyst that effects reaction between the β-epithiopropyl functional groups.

Also provided is a method of reducing the yellowness index of a sulfur-containing polymerizate prepared by addition polymerization. The method comprises reacting in the presence of an isourea functional polymerization initiator and a catalyst that effects reaction between β-epithiopropyl functional groups, a polymerizable composition comprising: (a) a monomer composition comprising at least one ethylenically unsaturated monomer having a β-epithiopropyl functional group; and, optionally, (b) a compound having two or more β-epithiopropyl functional groups but no polymerizable ethylenically unsaturated groups.

DETAILED DESCRIPTION OF THE INVENTION

As used herein, molecular weight values of polymers, such as weight average molecular weights (Mw) and number average molecular weights (Mn), are determined by gel permeation chromatography using polystyrene standards.

As used herein, polydispersity index (PDI) values represent a ratio of the weight average molecular weight (Mw) to the number average molecular weight (Mn) of the polymer (i.e., Mw/Mn).

As used herein, the term "polymer" means homopolymers (e.g., prepared from a single monomer species), and copolymers (e.g., prepared from at least two monomer species).

As used herein, the term "(meth)acrylate" and similar terms, such as (meth)acryloyl and (meth)acrylic acid ester, means methacrylate and acrylate. Either or both may be present in a composition.

As used herein, the term "thio(meth)acrylate" and similar terms, such as thio(meth)acryloyl and thio(meth)acrylic acid ester, means thiomethacrylate and thioacrylate, as above.

As used herein, recitations of "linear or branched" groups, such as linear or branched alkyl, are understood to include: a methylene group or a methyl group; groups that are linear, such as linear $C_2$-$C_{25}$ alkyl groups; and groups that are appropriately branched, such as branched $C_3$-$C_{25}$ alkyl groups.

As used herein, the term "halo" and similar terms, such as halo group, halogen, halogen group, halide, and halide group means F, Cl, Br and/or I, such as fluoro, chloro, bromo and/or iodo.

Unless otherwise indicated, all ranges or ratios disclosed herein are to be understood to encompass any and all subranges or subratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to, 1 to 6.1, 3.5 to 7.8, and 5.5 to 10.

As used herein, the articles "a," "an," and "the" include plural referents unless otherwise expressly and unequivocally limited to one referent.

Other than in the operating examples, or where otherwise indicated, all numbers expressing quantities of ingredients, reaction conditions, and so forth used in the specification and claims are to be understood as modified in all instances by the term "about."

The polymerizable compositions of the present invention include (a) a monomer composition comprising at least one ethylenically unsaturated monomer having a β-epithiopropyl functional group. For example, the monomer composition (a) may comprise a compound having one or more (meth)acryloyl, allyl, and/or vinyl groups and one or more β-epithiopropyl functional groups in a molecule. Mixtures of such compounds may also be used. Examples of suitable monomers include, but are not limited to, thioglycidylmethacrylate (2,3-epithiopropyl methacrylate), allylthioglycidyl ether, and the like.

The ethylenically unsaturated monomer having a β-epithiopropyl functional group may be prepared ahead of time and added to the polymerizable composition, or alternatively may be prepared within the polymerizable composition from "precursor" reactants present in the polymerizable composition. For example, thioglycidylmethacrylate may be formed within the polymerizable composition as a reaction product of a reaction composition comprising glycidyl methacrylate and thiourea.

The ethylenically unsaturated monomer having a β-epithiopropyl functional group may constitute up to 100 percent by weight of the monomer composition (a), based on the total weight of resin solids in the monomer composition. For example, the monomer may be present in an amount ranging from 5 to 100 percent by weight, such as from 25 to 100 percent by weight, or from 25 to 85 percent by weight, or from 25 to 80 percent by weight.

In the polymerizable compositions of the present invention, the monomer composition (a) may further comprise at least one different polymerizable ethylenically unsaturated monomer. Ethylenically unsaturated groups include (meth) acryloyl, allyl, and/or vinyl groups. Useful alkyl esters of acrylic acid or methacrylic acid include aliphatic alkyl esters containing from 1 to 30, and preferably 4 to 18 carbon atoms in the alkyl group, which may be milear, branched, cyclic, and/or substituted. Representative alkyl groups include but are not limited to methyl, ethyl, propyl, isopropyl, butyl, isobutyl, sec-butyl, tert-butyl, pentyl, neopentyl, hexyl, heptyl, octyl, nonyl, decyl, and structural isomers thereof. Representative cycloalkyl groups include but are not limited to cyclopropyl, cyclobutyl, cyclopentyl, cyclohexyl, and cyclooctyl substituents. Representative poly-fused-ring cycloalkyl groups include but are not limited to decahydronaphthalenyl, tetradecahydroanthracenyl, and tetradecahydrophenanthrenyl. Representative polycyclicalkyl groups include but are not limited to, bicyclo[2.2.1]heptanyl (norbornyl), and bicyclo[2.2.2]octanyl. Representative heterocycloalkyl groups include but are not limited to tetrahydrofuranyl, tetrahydropyranyl and piperidinyl, including but not limited to piperidin-4-yl. Representative polycyclicheterocycloalkyl groups include but are not limited to, 7-thiabicyclo[2.2.1]heptanyl, 7-oxabicyclo[2.2.1]heptanyl, and 7-azabicyclo[2.2.1]heptanyl. Representative aralkyl groups include but are not limited to benzyl, and phenethyl. Examples of monomers having a single ethylenically unsaturated radically polymerizable group that can be present in the monomer composition (a) of the polymerizable compositions of the present invention include, but are not limited to: acrylic acid; methacrylic acid; esters of acrylic acid such as methyl or ethyl acrylate and 2-hydroxyethyl acrylate; esters of methacrylic acid, such as methyl or ethyl methacrylate, phenoxyethyl methacrylate, isobornyl methacrylate, cyclohexyl methacrylate and 2-hydroxyethyl methacrylate; allyl esters, e.g., allyl benzoate; allyl carbonates, e.g., phenyl allyl carbonate; vinyl esters such as vinyl acetate; styrene; and vinyl chloride. In some embodiments, the monoethylenically unsaturated monomers include methyl methacrylate, isobornyl methacrylate, phenoxyethyl methacrylate, cyclohexyl methacrylate, styrene and mixtures thereof. Monomers having more than one ethylenically unsaturated group, such as divinyl benzene, may also be used in the monomer composition (a). The ethylenically unsaturated monomer(s), when used, can be present in an amount of from 1 percent by weight to 60 percent by weight, based on the total monomer weight of the polymerizable composition, such as from 3 percent by weight to 55 percent by weight, or from 20 to 45 percent by weight, based on the total monomer weight of the polymerizable composition.

The monomer composition (a) can be present in the polymerizable composition of the present invention in an amount ranging from 5 to 100 percent by weight, such as from 25 to 100 percent by weight, or from 25 to 75 percent by weight, or from 50 to 60 percent by weight based on the total weight of resin solids in the polymerizable composition.

The polymerizable compositions of the present invention can further include a compound (b) having two or more β-epithiopropyl functional groups but no polymerizable ethylenically unsaturated groups. Examples of such compounds include bis(β-epithiopropyl)sulfide, bis(β-epithiopropyl)disulfide, and bis(β-epithiopropyloxyphenyl)propane. The compound (b) may be prepared ahead of time and added to the polymerizable composition, or alternatively may be prepared within the polymerizable composition from "precursor" reactants present in the polymerizable composition. For example, bis(β-epithiopropyloxyphenyl)propane may be formed within the polymerizable composition as a reaction product of a reaction composition comprising 2,2-bis(4-glycidyloxyphenyl)propane and thiourea. The 2,2-bis(4-glycidyloxyphenyl)propane may be formed as a reaction product of a reaction composition comprising 2,2-bis(4-hydroxyphenyl) propane (Bisphenol A) and epichlorohydrin.

When used, the compound (b) can be present in the polymerizable composition of the present invention in an amount of 0.5 to 75 percent by weight, such as 25 to 55 percent by weight, or 30 to 55 percent by weight, based on the total weight of resin solids in the polymerizable composition.

The weight ratio of the monomer composition (a) to the compound (b) in the polymerizable compositions of the present invention may range from 1:3 to 3:1. The ratio of (a) to (b) generally is 3:2.

The polymerizable compositions of the present invention further include an isourea functional polymerization initiator (c) that is capable of initiating free radical polymerization of and amongst the ethylenically unsaturated groups of the monomers. Such an initiator is thermally activated. By "thermally activated" means the free radical initiator becomes active at elevated temperature, such as at temperatures greater than ambient room temperature, such as greater than 25° C., as will be described in further detail herein.

The thermally activated free radical initiator can be selected from O-imino-isourea compounds, O-dialkylamino-isourea compounds, and combinations thereof. Suitable O-dialkylamino-isourea compounds are disclosed in WO 2010/079102 A1, incorporated herein by reference in its entirety. Such O-dialkylamino-isoureas compounds have the general formula I:

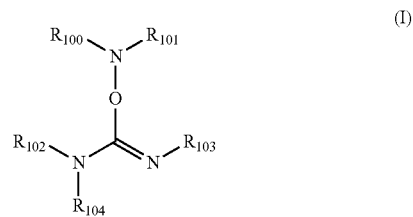

wherein $R_{100}$ and $R_{101}$ are each independently of one another $C_1$-$C_{20}$ alkyl or $C_6$-$C_{10}$ aryl; or $R_{100}$ and $R_{101}$ form together a mono or polycyclic heterocyclic ring, said heterocyclic ring optionally contains further heteroatoms O, S, N and P; $R_{102}$ and $R_{103}$ are independently $C_1$-$C_{19}$alkyl, $C_5$-$C_{12}$ cycloalkyl, $C_6$-$C_{10}$ aryl, $C_7$-$C_{10}$ aralkyl, $(CH_3)_3Si$—, said $C_1$-$C_{19}$ alkyl, $C_5$-$C_{12}$ cycloalkyl, $C_6$-$C_{10}$ aryl, $C_7$-$C_{10}$ aralkyl group is optionally interrupted by O or N atoms or substituted by $C_1$-$C_{19}$ alkyl groups or substituted by N containing groups selected from $C_1$-$C_{19}$ alkylamino, bis($C_1$-$C_{19}$ alkyl)amino or tris($C_1$-$C_{19}$ alkyl)ammonium; $R_{104}$ is H, $C1$-$C_{19}$ alkyl, $C_5$-$C_{12}$ cycloalkyl, $C_7$-$C_{10}$ aralkyl or acyl selected from the group consisting of the following acyls:
$C(=O)$—H, —$C(=O)$—$C_1$-$C_{19}$ alkyl, —$C(=O)$—$C_2$-$C_{19}$ alkenyl, —$C(=O)$—$C_6$-$C_{10}$ aryl, —$C(=O)$—$C_2$-$C_{19}$ alkenyl-$C_6$-$C_{10}$ aryl, —$C(=O)$—O—$C_1$-$C_{19}$ alkyl, —$C(=O)$—O—$C_6$-$C_{10}$ aryl, —$C(=O)$—NH—$C_1$-$C_{19}$ alkyl, —$C(=O)$—NH—$C_6$-$C_{10}$ aryl and —$C(=O)$—N($C_1$-$C_{19}$ alkyl)$_2$.

The structure of (I) can be such (e.g. dimeric, trimeric, oligomeric or polymeric) that the molecule (I) contains the isourea fragment more than once, for example 2 to 10 times.

Suitable O-imino-isourea compounds are disclosed in WO 2010/128062 A1, incorporated herein by reference in its entirety. Such O-imino-isourea compounds have the general formula II:

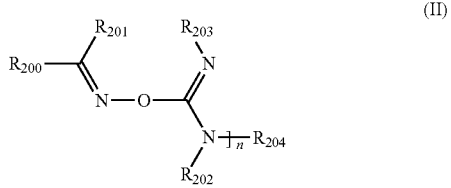

(II)

wherein n is 1, 2, 3 or 4,
$R_{200}$ and $R_{201}$ are independently H, $C_{1-18}$ alkyl, $C_3$-$C_{12}$ cycloalkyl, $C_6$-$C_{14}$ aryl, $C_1$-$C_{14}$ heteroaryl, $C_7$-$C_{15}$ aralkyl, $C_2$-$C_{14}$ heteroaralkyl, cyano, or $R_{200}$ and $R_{201}$ form together with the carbon to which they are attached a mono or polycyclic $C_3$-$C_{18}$ carbocyclic or $C_1$-$C_{18}$ heterocyclic ring;
$R_{202}$ and $R_{203}$ are independently $C_1$-$C_{18}$ alkyl, $C_3$-$C_{12}$ cycloalkyl, $C_6$-$C_{14}$ aryl, $C_6$-$C_{14}$ aryl one or more than once substituted by $C_1$-$C_{18}$ alkyl; $C_7$-$C_{15}$ aralkyl, $(CH_3)_3Si$—; or $R_{202}$ and $R_{203}$ are $C_1$-$C_{18}$ alkyl, $C_3$-$C_{12}$ cycloalkyl, $C_6$-$C_{14}$ aryl, $C_7$-$C_{15}$ aralkyl or
$R_{202}$ and $R_{203}$ are $C_1$-$C_{18}$alkyl, $C_3$-$C_{12}$ cycloalkyl which are interrupted or substituted by O or by N containing groups selected from $C_1$-$C_{18}$ alkylamino, bis($C_1$-$C_{18}$ alkyl)amino or tris($C_1$-$C_{11}$ alkyl)ammonium;
$R_{204}$ if n is 1 is H, $C_1$-$C_{18}$ alkyl, $C_3$-$C_{12}$ cycloalkyl, $C_7$-$C_{14}$ aralkyl, $C_6$-$C_{14}$ aryl or acyl selected from the group consisting of the following acyls
—$C(=O)$—H, —$C(=O)$—$C_1$-$C_{18}$ alkyl, —$C(=O)$—$C_2$-$C_{18}$ alkenyl, —$C(=O)$—$C_6$-$C_{14}$ aryl, —$C(=O)$—$C_2$-$C_{18}$ alkenyl-$C_6$-$C_{14}$ aryl, —$C(=O)$—O—$C_1$-$C_{18}$ alkyl, —$C(=O)$—O—$C_6$-$C_{14}$ aryl, —$C(=O)$—NH—$C_1$-$C_{18}$ alkyl, —$C(=O)$—NH—$C_6$-$C_{14}$ aryl and —$C(=O)$—N($C_1$-$C_{18}$ alkyl)$_2$; or
$R_{202}$ and $R_{204}$ if n is 1 form together with the nitrogen atom to which they are attached a 5 to 12 membered ring which my contain additional heteroatoms,
$R_{204}$ if n is more than 1 is di-, tri-, tetra-C-i-C-isalkylidene, diacyls, triacyls or tetraacyls and salts thereof.

Examples of such rings $R_{202}$-$R_{204}$ are: pyrrolidine, piperidine, morpholine, piperazine, N-methyl-piperazine, hexamethyleneimine.

The structure of (II) can be such (e.g. dimeric, trimeric, oligomeric or polymeric) that the molecule (II) contains the isourea fragment more than once, for example 2 to 10 times. Preferred is a monomeric structure (n is 1); a dimeric structure (n=2), or a trimeric structure n=3.

The isourea functional polymerization initiator is present an amount at least sufficient to initiate polymerization of the components in the monomer composition (a). Typically, only that amount that is required to initiate and sustain the polymerization reaction is required, which can be referred to as an "initiating amount". With some embodiments, the initiator is present in an amount of from 0.01 and 7 parts of initiator, or from 0.1 to 3.5 parts initiator, or from 0.5 to 2.5 parts initiator, in each case the parts initiator being per 100 parts of monomer(s) (phm) present in the polymerizable composition.

The polymerizable compositions of the present invention further include a catalyst (d) that effects or promotes reaction between the β-epithiopropyl functional groups. The catalyst is present in an amount at least sufficient to effect reaction among the β-epithiopropyl functional groups in the polymerizable composition, such that the β-epithiopropyl functional groups react with each other in a chemical reaction, such as a polymerization reaction.

Suitable catalysts for use as the catalyst (d) can include, but are not limited to, one or more of: phosphines; quaternary phosphonium salts; 1,4-diazabicyclo[2.2.2]octane, also known as 1,4-diazabicyclo[2.2.2]octane or triethylenediamine; other amine catalysts such as amines having a heterocyclic ring; quaternary ammonium salts; tertiary sulfonium salts; secondary iodonium salts; boron trihalides and complexes thereof; organic acids and esters thereof; and metal halides.

Non-limiting examples of suitable amines having a heterocyclic ring can include imidazoles such as imidazole, N-methylimidazole, N-methyl-2-mercaptoimidazole, 2-methylimidazole, 4-methylimidazole, N-ethylimidazole, 2-ethylimidazole, 4-ethylimidazole, N-butylimidazole, 2-butylimidazole, N-undecylimidazole, 2-undecylimidazole, N-phenylimidazole, 2-phenylimidazole, N-benzylimidazole, 2-benzylimidazole, 1-benzyl-2-methylimidazole, N-(2'-cyanoethyl)-2-methylimidazole, N-(2'-cyanoethyl)-2-undecylimidazole, N-(2'-cyanoethyl)-2-phenylimidazole, 3,3-bis (2-ethyl-4-methylimidazolyl)methane, adducts of alkylimidazole and isocyanuric acid, condensates of alkylimidazole and formaldehyde, and the like; and amidines such as 1,8-diazabicyclo[5.4.0]undecene, 1,5-diazabicyclo[4.3.0] nonene, 5,6-dibutylamino-1,8-diazabicyclo[5.4.0]undecene, and the like.

Specific non-limiting examples of suitable phosphines can include trimethylphosphine, triethylphosphine, triisopropylphosphine, tributylphosphine, tricyclohexylphosphine, trioctylphosphine, triphenylphosphine, tribenzylphosphine, tris (2-methylphenyl)phosphine, tris(3-methylphenyl) phosphine, tris(4-methylphenyl)phosphine, tris (diethylamino)phosphine, dimethylphenylphosphine, diethylphenylphosphine, dicyclohexylphenylphosphine, diethylphenylphosphine, dicyclohexylphenylphosphine, ethyldiphenylphosphine, diphenylcyclohexylphosphine, chlorodiphenylphosphine, and the like.

Suitable non-limiting examples of quaternary ammonium salts that may be used as a catalyst can include tetramethylammoniumchloride, tetramethylammoniumbromide, tetramethylammoniumacetate, tetraethylammoniumchloride, tetraethylammoniumbromide, tetraethylammoniumacetate, tetra-n-butylammoniumfluoride, tetra-n-butylammoniumchloride, tetra-n-butylammoniumbromide, tetra-n-butylammoniumiodide, tetra-n-butylammoniumacetate, tetra-n-butylammoniumborohydride, tetra-n-butylammoniumhexafluorophosphite, tetra-n-butylammoniumhydrogensulphite, tetra-n-butylammoniumtetrafluoroborate, tetra-n-butylammoniumtetraphenylborate, tetra-n-butylammoniumparatoluenesulfonate, tetra-n-hexylammoniumchloride, tetra-n-hexylammoniumbromide, tetra-n-hexylammoniumacetate, tetra-n-octylammoniumchloride, tetra-n-octylammoniumbromide, tetra-n-octylammoniumacetate, trimethyl-n-octylammoniumchloride, trimethylbenzylammoniumchloride, trimethylbenzylammoniumbromide, triethyl-n-octylammoniumchloride, triethylbenzylammoniumchloride, triethylbenzylammoniumbromide, tri-n-butyl-n-octylammoniumchlonde, tri-n-butylbenzylammoniumfluoride, tri-n-butylbenzylammoniumchloride, tri-n-butylbenzylammoniumbromide, tri-n-butylbenzylammoniumiodide, methyltriphenylammoniumchloride, methyltriphenylammoniumbromide, ethyltriphenylammoniumchloride, ethyltriphenylammoniumbromide, n-butyltriphenylammoniumchloride, n-butyltriphenylammoniumbromide, 1-methylpyridiniumbromide, 1-ethylpyridiniumbromide, 1-n-butylpyridiniumbromide, 1-n-hexylpyridiniumbromide, 1-n-octylpyridiniumbromide, 1-n-dodecylpyridiniumbromide, 1-phenylpyridiniumbromide, 1-methylpicoliniumbromide, 1-ethylpicoliniumbromide, 1-n-butylpicoliniumbromide, 1-n-hexylpicoliniumbromide, 1-n-octylpicoliniumbromide, 1-n-dodecylpicoliniumbromide, 1-phenylpicoliniumbromide, and the like.

Specific non-limiting examples of suitable quaternary phosphonium salts include tetramethylphosphoniumchloride, tetramethylphosphoniumbromide, tetraethylphosphoniumchloride, tetraethylphosphoniumbromide, tetra-n-butylphosphoniumchloride, tetra-n-butylphosphoniumbromide, tetra-n-butylphosphoniumiodide, tetra-n-hexylphosphoniumbromide, tetra-n-octylphosphoniumbromide, methyltriphenylphosphoniumbromide, methyltriphenylphosphoniumiodide, ethyltriphenylphosphoniumbromide, ethyltriphenylphosphoniumiodide, n-butyltriphenylphosphoniumbromide, n-butyltriphenylphosphoniumiodide, n-hexyltriphenylphosphoniumbromide, n-octyltriphenylphosphoniumbromide, tetraphenylphosphoniumbromide, tetrakishydroxymethylphosphoniumchloride, tetrakishydroxymethylphosphoniumbromide, tetrakishydroxyethylphosphoniumchloride, tetrakishydroxybutylphosphoniumchloride, and the like.

Specific, but non-limiting examples of the tertiary sulfonium salts include trimethylsulfoniumbromide, triethylsulfoniumbromide, tri-n-butylsulfoniumchloride, tri-n-butylsulfoniumbromide, tri-n-butylsulfoniumiodide, tri-n-butylsulfoniumtetrafluoroborate, tri-n-hexylsulfoniumbromide, tri-n-octylsulfoniumbromide, triphenylsulfoniumchloride, triphenylsulfoniumbromide, triphenylsulfoniumiodide, and the like.

Suitable secondary iodonium salts can include diphenyliodoniumchloride, diphenyliodoniumbromide, diphenyliodoniumiodide, and the like.

Specific examples of the boron trihalides and complexes thereof can include boron trifluoride, boron trifluoride-ethylether complex, boron trifluoride-n-butylether complex, boron trifluoride-phenol complex, boron trifluoride-ethylamine complex, boron trifluoride-piperidine complex, boron trifluoride-acetic acid complex, boron trifluoride-triethanolamine complex, boron trifluoride-ammonia complex, and the like.

Examples of catalytic organic acids and esters thereof can include sulfonic acid, carboxylic acid, and esters thereof. Specific examples thereof include methanesulfonic acid, trifluoromethanesulfonic acid, benzenesulfonic acid, p-toluenesulfonic acid, 10-chamfer sulfonic acid, and methyls and ethylesters thereof.

Specific examples of metal halides can include zinc chloride, iron chloride, aluminum chloride, tin chloride, titanium chloride, methylaluminum dichloride, ethylaluminum dichloride, dimethylaluminum chloride, and diethylaluminum chloride.

The amount of catalyst (d) present in the polymerizable composition is an amount sufficient to effect reaction between the β-epithiopropyl functional groups in the polymerizable composition. The amount of the catalyst can range, for example, from 0.001 to 3% by weight, such as 0.005 to 2% by weight, based on the total weight of resin solids in the polymerizable composition.

The polymerizable composition can be essentially free of inorganic compounds having sulfur and/or selenium atoms. By "essentially free of" is meant that the composition does not contain these compounds in any essential amounts such that they would be available to participate in any chemical reactions to an appreciable (measurable) degree. If they are present at all, it is only in trace amounts.

The thermal cure cycle used to cure the polymerizable compositions of the present invention generally involves heating the polymerizable composition in the presence of the initiator at room temperature (e.g., 25° C.) up to a temperature ranging from 50° C. to 150° C., over a period of from 2 hours to 48 hours, or from 55° C. up to 90° C. or 100° C. over a period of from 12 to 24 hours, or from 65° C. up to 115° C. or 125° C. over a period of from 12 to 24 hours.

Polymerization of the polymerizable compositions of the present invention results in the formation of a polymerizate, which can be in the form of a shaped article. Polymerizates obtained from polymerization of the polymerizable compositions of the present invention are solid, and with some embodiments, transparent. Transparent polymerizates prepared from the polymerizable compositions of the present invention, can be used in optical or ophthalmic applications, e.g., the polymerizates can be used to prepare lenses.

Upon polymerization of the composition of the present invention and formation of a polymerizate, the polymerizate demonstrates reduced yellowing compared to a similar polymerizable composition that does not contain an isourea functional polymerization initiator and a catalyst for reaction of β-epithiopropyl functional groups as described above. Polymerizates prepared using the composition of the present invention demonstrate significantly lower yellowness indices compared to similar polymerizable compositions that are polymerized using conventional initiators such as peroxides or azo compounds. As such, the present invention also provides a method of reducing the yellowness index of a sulfur-containing polymerizate prepared by addition polymerization, comprising reacting: (a) a monomer composition comprising at least one ethylenically unsaturated monomer having a β-epithiopropyl functional group; and, optionally, (b) a compound having two or more β-epithiopropyl functional groups but no polymerizable ethylenically unsaturated groups in the presence of an isourea functional polymerization initiator and a catalyst to effect reaction between the β-epithiopropyl functional groups. The ethylenically unsaturated monomer having a β-epithiopropyl functional group (a), and the compound (b) having two or more β-epithiopropyl functional groups but no polymerizable ethylenically unsaturated groups, respectively, are any of those described previously.

For purposes of the present invention yellowness index is measured in accordance with ASTM E313-10 as described below in the Examples.

Moreover, the use of an isourea functional polymerization initiator and catalyst as in the composition of the present invention can reduce gas evolution during polymerization as compared to conventional initiators such as peroxides. Ignition and combustion risks often associated with the use of peroxide initiators can be avoided with the use of isourea functional polymerization initiators and the catalysts as described above.

Polymerizates prepared from the polymerizable compositions of the present invention typically have a refractive index of at least 1.57, or at least 1.58, or at least 1.59; an ABBE number of at least 30, or at least 33, or at least 35; and a Fischer microhardness value of at least 50 N/mm$^2$, or at least 70 N/mm$^2$, or at least 90 N/mm$^2$. With some embodiments, polymerizates prepared from the polymerizable compositions of the present invention have an initial (zero second) Barcol hardness of at least 1, or at least 10, or at least 20. The refractive index, ABBE number, and Fischer Hardness values can be determined in accordance with art-recognized methods. Refractive index values ($n_D^{20}$) and ABBE numbers may be determined using a Metricon Model 2010 Prism Coupler, Thin Film Thickness/Refractive Index Measurement System, in accordance with the manufacturer's Operation and Maintenance Guide; and Fischer Hardness values are determined in accordance with ISO 14577 using a Fischer Technologies H100C Microhardness Measurement System.

Polymerizates prepared from the polymerizable compositions of the present invention can be used to form solid articles such as optical element(s) or device(s). As used herein the term "optical" means pertaining to or associated with light and/or vision. For example, the optical element or device can comprise ophthalmic elements and devices, display elements and devices, windows, mirrors, and/or active and passive liquid crystal cell elements and devices. As used herein the term "ophthalmic" means pertaining to or associated with the eye and vision. Non-limiting examples of ophthalmic elements include corrective and non-corrective lenses, including single vision or multi-vision lenses, which may be either segmented or non-segmented multi-vision lenses (such as, but not limited to, bifocal lenses, trifocal lenses and progressive lenses), as well as other elements used to correct, protect, or enhance (cosmetically or otherwise) vision, including without limitation, contact lenses, intra-ocular lenses, magnifying lenses, and protective lenses or visors. As used herein the term "display" means the visible or machine-readable representation of information in words, numbers, symbols, designs or drawings. Non-limiting examples of display elements and devices include screens, monitors, and security elements, such as security marks. As used herein the term "window" means an aperture adapted to permit the transmission of radiation there-through. Non-limiting examples of windows include automotive and aircraft transparencies, filters, shutters, and optical switches. As used herein the term "mirror" means a surface that specularly reflects a large fraction of incident light.

The present invention is more particularly described in the following examples, which are intended to be illustrative only, since numerous modifications and variations therein will be apparent to those skilled in the art. Unless otherwise specified, all parts and percentages are by weight.

EXAMPLES

The preparation of Examples 1-6 and Comparative Examples (CE) 1-13 is described in Part 1. Part II describes the preparation of polymerizate sheets of Examples 1-6 and CE 1-7 and viscous liquid polymerizates of CE 8-13. The results reported in Table 1 showed that Examples 1-6 demonstrated yellowness indexes that were lower than CE 1-7. The results in Table 2 showed that the isourea functional initiators did not show the unexpected result of reduced yellowness when thiirane was not present in the monomer compositions of CE 9, 11 and 13 as compared to the peroxy functional initiators in the monomer compositions of CE 8, 10 and 12.

Part I

Preparation of Polymerizates of Examples 1-6 and Comparative Examples (CE) 1-13

Example 1

Step A

Into a 50 mL round-bottom flask under N2 was added cyclohexanone oxime (2.87 g, 25.3 mmol) and tetrahydrofuran (THF) (15 mL). The round bottom of the flask was submersed in a room temperature water bath to modulate any exotherm (however, none was observed), and diisopropylcarbodiimide (3.8 g, 30.1 mmol) was added, followed immediately by ground NaOH (0.1 g, 2.5 mmol). The resulting solution was stirred for 6 hours in the room temperature water bath using a magnetic stirrer, becoming turbid at some point. The mixture was filtered using a Buchner funnel and Whatman #4 filter paper. After cooling the resulting mixture to 4° C., it was filtered and concentrated under reduced pressure to yield a light yellow solid (3.27 g). NMR showed that the product had a structure consistent with 1,3-diisopropyl-O—(N-cyclohexylideneamino)-isourea.

Step B

Into a 20 mL glass scintillation vial was added 100 parts by weight of thioglycidyl methacrylate which was filtered through a 0.45 μm syringe filter, 1 part N-methylimidazole and 1 part of the product of Step A. The components were mixed and/or placed in an ultrasonic bath at ambient temperature until a homogeneous solution was obtained. The mixture was injected into a glass sheet mold having a thickness of 3 mm and diameter appropriate for the amount injected. The mixture in the mold was cured by raising the temperature from 30° C. to 110° C. at a uniform rate over 22 hours in an oven, followed by cooling to 85° C. at a uniform rate over 2 hours and demolding.

Comparative Example 1

CE-1

The procedure from Step B of Example 1 was followed except that 1 part TRIGONOX® 421 polymerization initiator, reported to be 1,1,3,3-tetramethylbutylperoxy-2-ethylhexanoate, was used in place of 1 part 1,3-diisopropyl-O—(N-cyclohexylideneamino)-isourea.

Example 2

The procedure from Step B of Example 1 was followed except that 1 part of tetrabutylphosphonium bromide was used in place of 1 part of N-methylimidazole and 1.5 parts of 1,3-diisopropyl-O—(N-cyclohexylideneamino)-isourea was used in place of 1.0 part.

Comparative Example 2

CE-2

The procedure from Example 2 was followed except that 0.8 part TRIGONOX® 421 was used in place of 1.5 parts of 1,3-diisopropyl-O—(N-cyclohexylideneamino)-isourea.

Example 3

The procedure from Step B of Example 1 was followed except that the following was used: 90 parts of filtered thioglycidyl methacrylate, 10 parts of bis-(β-epithiopropyl) sulfide, 1 part of boron trifluoride diethyl etherate and 1 part of 1,3-diisopropyl-O—(N-cyclohexylideneamino)-isourea.

Comparative Example 3

CE-3

The procedure from Example 3 was followed except that 1 part of TRIGONOX® 421 was used in place of 1 part of 1,3-diisopropyl-O—(N-cyclohexylideneamino)-isourea.

Example 4

The procedure from Step B of Example 1 was followed except that the following were used: 41.7 parts of filtered thioglycidyl methacrylate, 41.7 parts of 4,4-isopropylidene-diphenol-di(2,3-epithiopropyl)ether, 12.5 parts of methyl methacrylate, 4.17 parts of butyl acrylate and 1 part of 1,3-diisopropyl-O—(N-cyclohexylideneamino)-isourea.

Comparative Example 4

CE-4

The procedure from Example 4 was followed except that 1 part of TRIGONOX® 421 was used in place of 1 part of 1,3-diisopropyl-O—(N-cyclohexylideneamino)-isourea.

Example 5

The procedure from Step B of Example 1 was followed except that the following were used: 46.5 parts of filtered thioglycidyl methacrylate, 46.5 parts of 4,4-isopropylidene-diphenol-di(2,3-epithiopropyl)ether, 4.7 parts of methyl methacrylate, 2.3 parts of butyl acrylate, 1 part of tetrabutylphosphonium bromide and 1 part of 1,3-diisopropyl-O—(N-cyclohexylideneamino)-isourea.

Comparative Example 5

CE-5

The procedure from Example 5 was followed except that 0.6 part of TRIGONOX® 421 was used in place of 1 part of 1,3-diisopropyl-O—(N-cyclohexylideneamino)-isourea.

Example 6

The procedure from Example 5 was followed except that 1.25 parts of 1,3-diisopropyl-O—(N-cyclohexylideneamino)-isourea were used instead of 1 part.

Comparative Example 6

CE-6

The procedure from Example 5 was followed except that 0.8 part of TRIGONOX® 421 was used in place of 1 part of 1,3-diisopropyl-O—(N-cyclohexylideneamino)-isourea.

Comparative Example 7

CE-7

The procedure from Example 5 was followed except that 0.8 part of LUPEROX® 256 polymerization initiator, reported to be 2,5-dimethyl-2,5-di-(2-ethylhexanoylperoxy)hexane, was used in place of 1 part of 1,3-diisopropyl-O—(N-cyclohexylideneamino)-isourea.

Comparative Example 8

CE-8

Into a 50 mL three-necked round-bottom flask equipped with a magnetic stirrer placed under a N2 atmosphere was added 12.85 g (100 mmol) of n-butyl methacrylate and 444 mg (1 mmol) of LUPEROX® 256. The flask was immersed into a water bath equilibrated and held at 80° C. After 5 hours, the mixture became viscous and was dissolved in n-butyl acetate. The solids level was adjusted to 26.5% based on weight. Percent solids described herein was determined by weighing a sample before and after heating at 110° C. for an hour and reporting the residue weight as the percentage of the initial weight measured before heating.

Comparative Example 9

CE-9

Step A

Into a 50 mL round-bottom flask under N2 was added cyclohexanone oxime (6.56 g, 49.9 mmol) and THF (30 mL). Dicyclohexylcarbodiimide (11.34 g, 55.0 mmol) was added, followed immediately by ground NaOH (0.2 g, 5 mmol). The resulting solution was stirred for 4 hours at room temperature, becoming reddish and turbid at some point. Dichloromethane (25 mL) was added and the resulting mixture was filtered and concentrated. To the resulting liquid residue was added acetonitrile (25 mL), and the suspension was stirred vigorously for 30 min. The resulting top layer was decanted and discarded and the remaining residue was diluted with dichloromethane, filtered and concentrated, yielding orange oil (8.73 g). NMR showed that the product had a structure consistent with 1,3-dicyclohexyl-O—(N-cyclohexylideneamino)-isourea.

Step B

The procedure of CE-8 was followed except that the product of Step A (319 mg (1 mmol)) was used in place of LUPEROX® 256.

Comparative Example 10

CE-10

The procedure of CE-8 was followed except that after polymerization the resulting material was dissolved in a 1:1 (weight basis) mixture of n-butyl acetate and tetrahydrofuran (THF) and adjusted to 22.2% solids.

Comparative Example 11

CE-11

The procedure of CE-8 was followed except that 240 mg (1 mmol) 1,3-diisopropyl-O—(N-cyclohexylideneamino)-isourea was used in place of LUPEROX® 256 and the resulting material was processed after polymerization following the procedure of CE-10.

Comparative Example 12

CE-12

The procedure of CE-8 was followed except that 222 mg (0.5 mmol) of TRIGONOX® 421, was used in place of LUPEROX® 256, and after polymerization, the resulting material was dissolved in THF and adjusted to 20% solids.

Comparative Example 13

CE-13

The procedure of CE-8 was followed except that 120 mg (0.5 mmol) 1,3-diisopropyl-O—(N-cyclohexylideneamino)-isourea was used in place of LUPEROX® 256 and the resulting material was processed after polymerization following the procedure of CE-12.

Part II

Properties of Polymerizates

Polymerizate sheet samples of Examples 1-6 and CE 1-7 were tested for Fischer microhardness (FMH), refractive index and yellowness index and the results are reported in Table 1. The viscous liquid polymerizate samples of CE-8-13 were tested for molecular weight and yellowness index and the results are reported in Table 2.

The tests were performed according to the following procedures. Fischer microhardness was tested according to ISO 14577-07 and was measured using a FISCHERSCOPE® H-100SMC available from Fischer Technology, Inc. The Fischer microhardness (FMH) of the polymerizates, ±3 Newtons/mm$^2$, was measured at a load of 300 milliNewton (mN), following a load application of 0-300 mN in 15 seconds. The results are an arithmetic average of 5 measurements.

The refractive index of the solid samples of Examples 1-6 and CE 1-7 was measured at 546 nm (mercury e-line) and 23° C. using a METRICON® Model 2010M prism coupler according to ASTM C1648-06.

The yellowness index was measured using a HunterLab ULTRASCAN® PRO according to ASTM E313-10. The path length for the sheet samples of Examples 1-6 and CE 1-7 was equal to the sample thickness (3 mm) and the path length for the liquid samples of CE-8-13 was 2 cm.

The viscous polymerizates of CE-8-13 were dissolved in tetrahydrofuran and the weight average molecular weight (Mw) was determined by gel permeation chromatography, also referred to as size exclusion chromatography, using the appropriate polystyrene standards.

TABLE 1

Properties of Polymerizates of Example 1-6 and CE-1-7

| Example # | FMH (N/mm$^2$) | Refractive Index | Yellowness Index |
|---|---|---|---|
| 1 | 199 | 1.585 | 28.66 |
| CE-1 | 212 | 1.585 | 56.10 |
| 2 | 204 | 1.585 | 30.07 |
| CE-2 | 213 | 1.586 | 48.75 |
| 3 | 145 | 1.589 | 78.15 |
| CE-3 | 174 | 1.591 | 125.44 |
| 4 | 193 | 1.585 | 10.2 |
| CE-4 | 183 | 1.585 | 11.9 |
| 5 | 188 | 1.590 | 10.9 |
| CE-5 | 193 | 1.591 | 14.0 |
| 6 | 191 | 1.590 | 11.8 |
| CE-6 | 194 | 1.589 | 14.8 |
| CE-7 | 173 | 1.590 | 13.7 |

TABLE 2

Properties of the Polymerizates of CE-8-13

| Example # | M$_w$ (grams/Mole) | Yellowness Index |
|---|---|---|
| CE-8 | 218,137 | 5.64 |
| CE-9 | 266,327 | 26.68 |
| CE-10 | 211,568 | −20.73 |
| CE-11 | 251,521 | 5.66 |
| CE-12 | 159,946 | 2.18 |
| CE-13 | 294,477 | 2.01 |

The results reported in Table 1 showed the unexpected results that the yellowness indexes of Examples 1-6 were lower than those of Comparative Examples 1-7. In most cases, the Comparative Examples demonstrated comparable Fischer microhardness and refractive index results.

The yellowness indexes reported in Table 2 showed that when thiirane was not present in the monomer compositions of Comparative Examples (CE) 8-13, the results for the isourea functional polymerization initiator in CE-9 and CE-11 showed higher levels of yellowness than the peroxyesters in CE-8 and CE-10; and similar results when comparing CE-12 and CE-13. Comparable levels of polymerization were demonstrated for CE-8 to C-11 and CE-13 based on the reported weight average molecular weights.

The present invention has been described with reference to specific details of particular embodiments thereof. It is not intended that such details be regarded as limitations upon the scope of the invention except insofar as and to the extent that they are included in the accompanying claims.

What is claimed is:

1. A polymerizable composition consisting of:
    (a) a monomer composition comprising at least one ethylenically unsaturated monomer having a β-epithiopropyl functional group;
    (b) a compound having two or more β-epithiopropyl functional groups but no polymerizable ethylenically unsaturated groups;
    (c) an isourea functional polymerization initiator; and
    (d) a catalyst present in an amount sufficient to effect reaction between the β-epithiopropyl functional groups, wherein the monomer composition (a) further comprises at least one different polymerizable ethylenically unsaturated monomer comprising at least one of styrene, an alkyl acrylate, and an alkyl methacrylate.

2. The polymerizable composition of claim 1, wherein upon polymerization and formation of a polymerizate, the polymerizate demonstrates reduced yellowing compared to a similar polymerizable composition that does not contain the isourea functional polymerization initiator and the catalyst.

3. A polymerizate of the polymerizable composition of claim 2.

4. An optical element comprising the polymerizate of claim 3.

5. The polymerizable composition of claim 1, wherein the ethylenically unsaturated monomer having a β-epithiopropyl functional group comprises thioglycidylmethacrylate.

6. The polymerizable composition of claim 5, wherein the thioglycidylmethacrylate is formed within the polymerizable composition as a reaction product of a reaction composition comprising glycidyl methacrylate and thiourea.

7. The polymerizable composition of claim 1, wherein the compound (b) having two or more β-epithiopropyl functional groups but no polymerizable ethylenically unsaturated groups is present in the polymerizable composition and is formed within the polymerizable composition as a reaction product of a reaction composition comprising 2,2-bis(4-glycidyloxyphenyl)propane and thiourea.

8. The polymerizable composition of claim 7, wherein the 2,2-bis(4-glycidyloxyphenyl)propane is a reaction product of a reaction composition comprising 2,2-bis(4-hydroxyphenyl)propane and epichlorohydrin.

9. The polymerizable composition of claim 1, wherein the isourea functional polymerization initiator (c) comprises at least one of an O-dialkylamino-isourea and an O-imino-isourea.

10. The polymerizable composition of claim 1, wherein the catalyst (d) comprises at least one of 1,4-diazabicyclo[2.2.2]octane, amines having a heterocyclic ring, phosphines, quaternary ammonium salts, quaternary phosphonium salts, tertiary sulfonium salts, secondary iodonium salts, boron trihalides and complexes thereof, organic acids and esters thereof, and metal halides.

11. A method of reducing the yellowness index of a sulfur-containing polymerizate prepared by addition polymerization, comprising reacting in the presence of an isourea functional polymerization initiator and a catalyst that effects reaction between β-epithiopropyl functional groups, the polymerizable composition of claim 1.

12. The method of claim 11, wherein upon polymerization and formation of a polymerizate, the polymerizate demonstrates reduced yellowing compared to a similar polymerizable composition that does not contain the isourea functional polymerization initiator and the catalyst.

13. The method of claim 11, wherein the ethylenically unsaturated monomer having a β-epithiopropyl functional group comprises thioglycidylmethacrylate.

14. The method of claim 13, wherein the thioglycidylmethacrylate is formed within the polymerizable composition as a reaction product of a reaction composition comprising glycidyl methacrylate and thiourea.

15. The method of claim 11, wherein the compound (b) having two or more β-epithiopropyl functional groups but no polymerizable ethylenically unsaturated groups is present in the polymerizable composition and is formed within the polymerizable composition as a reaction product of a reaction composition comprising 2,2-bis(4-glycidyloxyphenyl)propane and thiourea.

16. The method of claim 15, wherein the 2,2-bis(4-glycidyloxy phenyl)propane is a reaction product of a reaction composition comprising 2,2-bis(4-hydroxyphenyl)propane and epichlorohydrin.

17. The method of claim 11, wherein the isourea functional polymerization initiator (c) comprises at least one of an O-dialkylamino-isourea and an O-imino-isourea.

18. The method of claim 11, wherein the catalyst comprises at least one of 1,4-diazabicyclo[2.2.2]octane, amines having a heterocyclic ring, phosphines, quaternary ammonium salts, quaternary phosphonium salts, tertiary sulfonium salts, secondary iodonium salts, boron trihalides and complexes thereof, organic acids and esters thereof, and metal halides.

* * * * *